United States Patent [19]

Ueki et al.

[11] Patent Number: 5,149,465
[45] Date of Patent: Sep. 22, 1992

[54] CONDUCTIVE RESIN COMPOSITION

[75] Inventors: Toru Ueki; Kenji Sakata; Masaji Yoshimura; Kazuharu Kanezaki; Ineo Iwata, all of Kanagawa, Japan

[73] Assignee: Mitsui Toatsu Chemicals, Incorporated, Tokyo, Japan

[21] Appl. No.: 674,381

[22] Filed: Mar. 25, 1991

[30] Foreign Application Priority Data

Mar. 29, 1990 [JP] Japan ................... 2-078688

[51] Int. Cl.$^5$ ............................................. H01B 1/06
[52] U.S. Cl. ..................................... 252/511; 252/502
[58] Field of Search ............... 252/511, 503, 504, 506, 252/507, 516; 524/495, 496; 523/137

[56] References Cited

U.S. PATENT DOCUMENTS

| | | | |
|---|---|---|---|
| 4,596,670 | 6/1986 | Lui | 252/511 |
| 4,664,900 | 5/1987 | Miyazaki et al. | 423/447.3 |
| 4,696,956 | 9/1987 | Nabeta et al. | 523/137 |
| 4,704,413 | 11/1987 | Nabeta et al. | 252/511 |
| 4,853,155 | 8/1989 | Kurasawa | 252/512 |
| 4,882,227 | 11/1989 | Iwase et al. | 428/407 |
| 4,986,946 | 1/1991 | Parish | 252/511 |
| 5,004,561 | 4/1991 | Nomura et al. | 252/511 |

FOREIGN PATENT DOCUMENTS 62-100553  5/1987  Japan .

Primary Examiner—Mark L. Bell
Assistant Examiner—Alan Wright
Attorney, Agent, or Firm—Burns, Doane, Swecker & Mathis

[57] ABSTRACT

A conductive resin composition which has electrical conductivity and antistatic property, is excellent in heat resistance and processability, and comprises:

(A) from 50 to 95% by weight of a polyphenylene ether resin, (B) from 50 to 5% by weight of a copolymer of a styrenic compound and an $\alpha,\beta$-unsaturated dicarboxylic acid imide compound, (C) from 5 to 30 parts by weight of a conductive carbon per 100 parts by weight of the sum of the resin (A) and the copolymer (B), and (D) from 1 to 20 parts by weight of a low molecular weight polystyrene per 100 parts by weight of the sum of the resin (A) and the copolymer (B).

9 Claims, No Drawings

CONDUCTIVE RESIN COMPOSITION

BACKGROUND OF THE INVENTION a. Field of the Invention

The present invention relates to a conductive resin composition which has electrical conductivity and antistatic property and is excellent in processability represented by melt flow index and heat resistance which is a property represented by heat distortion temperature.

b. Description of the Prior Art

Accompanied by high density packaging of electronic equipment, IC parts are mounted on a through-hole substrate in order to increase density. If moisture is adsorbed in the IC parts in the mounting step using flow solder, water vapor generated by heating in the interior of the IC parts, leads to blisters or cracks, and damages the IC parts. As a countermeasure, it has been required, to dry the IC parts at temperature of above 120° C. to remove before the mounting step moisture.

Conventionally, the IC parts drying step is carried out after transferring the IC parts from a tray of conductive polyvinyl chloride resin or styrenic resin to a die-cast aluminum tray. The dried IC parts are delivered after transferring again to the above resin tray. Thus a complex step has been required. In order to simplify the steps and to replace the expensive die-cast aluminum tray, plastics which develop no warpage even in the IC drying step of above 120° C. and are excellent in dimensional stability have been investigated for use a heat-resistant tray for IC parts.

Other electronic accessories such as IC magazine cases, TAB carriers and printed substrate inserting racks are also requried to have heat resistance of 120° C. or above.

High-heat-resistant resin include, for example, polyamide resin, polyester resins and compositions obtained by blending glass fibers with these resins. Any of these resins a crystallinity and hence have a large molding shrinkage and poor dimensional stability. Compositions of amorphous resins such as polycarbonate which contains glass fibers are also used. However, glass fibers cause warpage and inferior dimensional stability.

High-heat-resistant amorphous resin include polyether sulfones, polyarylates and polyethermides. These resins, however, have poor processability.

SUMMARY OF THE INVENTION

An object of the present invention is to provide a conductive resin composition which has electrical conductivity, antistatic property and heat resistance of 120° C. or above and is excellent in processability.

The above object of the invention can be accomplished by providing a conductive resin composition comprising (A) from 50 to 95% by weight of a polyphenylene ether resin, (B) from 50 to 5% by weight of a copolymer of a styrenic compound and an α,β-unsaturated dicarboxylic acid imide compound, (C) from 5 to 30 parts by weight of a conductive carbon per 10 parts by weight of the sum of the resin (A) and the copolymer (B), and (D) from 1 to 20 parts by weight of a low molecular weight polystyrene per 100 parts by weight of the sum of the resin (A) and the copolymer (B).

DESCRIPTION OF THE PREFERRED EMBODIMENTS

The polyphenylene ether resin (A) which constitutes the conductive resin composition of the invention is a homopolymer or a copolymer comprising one or more of structural units represented by the formula (I):

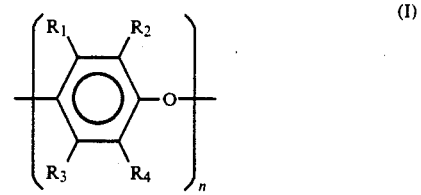

wherein each of $R_1$, $R_2$, $R_3$ and $R_4$ is individually selected from the group consisting of a hydrogen atom, halogen atom, hydrocarbon, halogenated hydrocarbon, hydrocarbonoxy and halogenated hydrocarbonoxy group, and n is an integer of 20 or more.

No particular restriction is imposed upon the preparation process of the polyphenylene ether resin (A). The resin (S) can be prepared by the reaction of phenol derivatives according to, for example, USP 3306874, 3306875, 3257357 and 3257358. The phenol derivatives include 2,6-dimethylphenol, 2,6-diethylphenol, 2,6-dibutylphenol, 2,6-didodecylphenol, 2,6-dipropylphenol, 2,6-diphenylphenol, 2-methyl-6-ethylphenol, 2-methyl-6- cyclohexylphenol, 2-methyl-6-methoxyphenol, 2-methyl-6-butylphenol, 2,6-dimethoxyphenol, 2,3,6-trimethylphenol, 2,3,5,6-tetramethylphenol, 2,6-diethoxyphenol and other alkyl or alkoxy derivatives of phenol. The prefer red polyphenylene ether resing (A) in the invention is poly(2,6-dimethyl-1,4-phenylent)ether.

The inherent viscosity of the polyphenylene ether resin (A) is preferably in the range of 0.25 to 0.70 dl/g at 25° C. in chloroform solution.

The styrenic compound which constitutes the copolymer (B) of the styrenic compound and the α,β-unsaturated dicarboxylic acid imide compound in the invention includes, for example, styrene, α-methylstyrene, o-methylstyrene and p-methylstyrene.

The α,β-unsaturated dicarboxylic acid imide compound is represented by the formula (II):

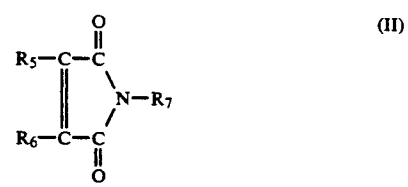

wherein each of $R_5$, $R_6$ and $R_7$ is individually selected from a hydrogen atom, alkyl, substituted alkyl, alkenyl, substituted alkenyl, cycloalkyl, substituted cycloalkyl, phenyl or substituted phenyl. Useful imide compounds include maleimide, N-methylmaleimide, N-cyclohexylmaleimide, N-phenylmaleimide, N-(p-hydroxyphenyl)-maleimide and N-benzylmaleimide.

In the copolymer (B) of the styrenic compound and the α,β-unsaturated dicarboxylic acid imide compound, preferred proportions of the monomers are in the range of from 30 to 95% by weight of the styrenic compound and from 70 to 5% by weight of the α,β-unsaturated dicarboxylic acid imide compound. The number average molecular weight of the copolymer (B) is preferably 30,000 or as determined by gel permeation chromatography (GPC) based on a standard by gel permeation chromatography (GPC).

The proportion of the polyphenylene ether resin (A) to the copolymer (B) of the styrenic compound and the α,β-unsaturated dicarboxylic acid imide compound is in the range of from 50 to 95% by weight of the resin (A) to from 50 to 5% by weight of the copolymer (B), preferably in the range of from 80 to 95% by weight of the resin (A) to from 20 to 5% by weight of the copolymer (B). An amount of polyphenylene ether resin (A) less than 50% by weight gives insufficient heat resistance. On the other hand, an amount of resin (A) exceeding 95% by weight leads to poor flowability and good molded articles cannot be obtained.

The conductive carbon (C) used for the invention is filled into the resin, provides a high electrical conductivity for the resin and remarkably reduces surface resistance of the resin. Acetylene black and furnace black are preferably used. Exemplary furnace black includes marketed products such as Ketchen Black EC (Trade mark of Akzo in Holland), ASAHI HS-500 (Trade mark of Asahi Carbon in Japan) and Vulcan XC-72 (Trade mark of Cabot in USA).

Electrical conductivity can be sufficiently provided in the invention by formulating conductive carbon in the resin composition. Other conductive fillers can also be added depending upon the desired level of conductivity increase. Other conductive fillers include, for example, a single material or a mixture of materials selected from silver, copper, gold, aluminum, nickel, palladium, iron, stainless steel, tin oxide, indium oxide, lead oxide, silicon carbide, zirconium carbide, titanium carbide graphite, carbon; that can be in the form of powder, flakes, beads or fibers.

The amount of conductive carbon (C) is in the range of from 5 to 30 parts by weight, preferably from 6 to 20 parts by weight, more preferably from 7 to 15 parts by weight, per 100 parts by weight of the sum of the polyphenylene ether resin (A) and the copolymer (B) of the styrenic compound and the α,β-unsaturated dicarboxylic acid imide compound. An amount less than 5 parts by weight leads to insufficient conductivity. An amount exceeding 30 parts by weight causes decrease in flowability and mechanical strength. The result is that good molded articles are difficult to obtain.

The low molecular weight polystyrene (D) used in the present invention has a number average molecular weight of 30,000 or less, preferably 20,000 or less, more preferably 12,000 or less as determined by gel permeation chromatography (GPC), based on a polystyrene standard by gel permeation chromatography (GPC) and can be obtained from the market.

The low molecular weight polystyrene (D) has the effect of improving flowability. Simultaneous use of the polystyrene (D) with the conductive carbon (C) can effectively decrease surface resistance of molded articles as compared with single use of the conductive carbon (C). The amount of the conductive carbon (C) can be thus reduced and lowering of mechanical strength can be inhibited.

The amount of the low molecular weight polystyrene (D) is in the range of from 1 to 20 parts by weight, preferably from 2 to 15 parts by weight per 100 parts by weight of the sum of the polyphenylene ether resin (A) and the copolymer (B) of the styrenic compound and the α,β-unsaturated dicarboxylic acid imide compound. An amount less than 1% by weight has little effect on surface resistance reduction of molded articles and flowability improvement. On an other hand, the amount exceeding 20 parts by weight leads to reduction of heat resistance.

Various elastomers can also be added in the composition of the invention in order to improve mechanical strength. Exemplary elastomers include styrene-butadiene rubber, styrene-butadiene-styrene ternary block copolymer elastomer and its butadiene-segment-hydrogenated elastomer, ethylene-propylene rubber, ethylene-propylene-diene ternary copolymer elastomer and methyl methacrylate-ethyl acrylate core-shell type elastomer. When the elastomers are added in the composition of the invention, the amount of the elastomers is preferably from 1 to 20 parts by weight per 100 parts by weight of the sum of the polyphenylene ether resin (A) and the copolymer (B).

No particular restriction is imposed on the preparation process of the conductive resin composition of the invention. Usually known processes can be employed for the preparation. For example, the polyphenylene ether resin (A), the copolymer (B) of the styrenic compound and the α,β-unsaturated dicarboxylic acid imide compound, the conductive carbon (C) and the low molecular weight polystyrene (D) are uniformly mixed with a high speed stirrer. The mixture obtained is then melt-kneaded with a single or multiple screw extruder having sufficient capacity, extruded and cut into pellets.

Additives can be incorporated depending upon the object. Useful additives include, for example, pigments and dyes; reinforcements such as glass fibers, metal fibers and carbon fibers; fillers such as talc and calcium carbonate; antioxidants, ultraviolet absorbers, lubricants, flame retardants and antistatics.

EXAMPLE

The present invention will hereinafter be illustrated further in detail by way of examples and comparative examples. The properties of the compositions used in the examples and comparative examples were evaluated by the following methods:

(1) Melt flow index (processability)

In accordance with JIS K-7210, under 10 kg load, at temperature of 300° C.

(2) Heat distortion temperature (heat resistance)

In accordance with JIS K-7207 at a bending stress of 18.56 kg/cm$^2$.

(3) Surface resistance of a molded article

A flat plate having dimensions of 300 x 300 x 1 mm was injection molded. Surface resistance was measured with a surface resistance tester RESISTAT (Trade mark of Mitsubishi Petrochemical) at 23° C. and 50% relative humidity.

EXAMPLE 1

Ninety parts by weight of polyphenylene ether resin (A) having an inherent viscosity of 0.45 dl/g at 25° C. in a chloroform solution, 10 parts by weight of a copolymer (B) of styrenic compound and an α,β-unsaturated dicarboxylic acid imide compound (styrene=80% by weight, N-methyl maleimide=20% by weight, number average molecular weight=20,000), 10 parts by weight of conductive carbon (C) (Ketchen BLACK EC, manufactured by Akzo) and 3 parts by weight of low molecular weight polystyrene (D) having a number average molecular weight of 5,000 (manufactured by Sanyo Chemical Industries) were blended, kneaded in a temperature range of from 270° to 300° C., and pelletized. The pellets thus obtained were injection molded to form test pieces. Physical properties were evaluated by the above methods. Results are illustrated in Table 1.

EXAMPLES 2-3

The same procedures as described in Example 1 were carried out except that the polyphenylene ether resin (A) and the copolymer (B) of the styrenic resin and the α,β-unsaturated dicarboxylic imide compound were used in proportions illustrated in Table 1. Results are illustrated in Table 1.

EXAMPLES 4-5

The same procedures as described in Examples 1 and 2 were carried out except that low molecular weight polystyrene (D) was used in proportions illustrated in Table 1. Results are illustrated in Table 1. When the amount of low molecular weight polystyrene (D) was increased, the surface resistance was lowered and electrical conductivity was improved.

EXAMPLE 6

In Example 2, a polyphenylene ether resin (A) having an inherent viscosity of 0.50 dl/g at 25° C. in a chloroform solution and a copolymer (B) of styrenic compound and α,β-unsaturated dicarboxylic acid imide compound which is composed of 90% by weight of styrene and 10% by weight of N-phenylmaleimide and has a number average molecular weight of 10,000 were used, and 7 parts by weight of hydrogenated styrene-isoprene block copolymer (system 1001 manufactured by Kuraray) were added as an elastomer. Other procedures were the same as described in Example 2. Results are illustrated in Table 1.

EXAMPLE 7

The same procedures as described in Example 6 were carried out except that a copolymer which is composed of 75% by weight of styrene and 25% by weight of N-cyclohexylmaleimide and has a number average molecular weight of 15,000 was used as the copolymer (B) of styrenic compound and α,β-unsaturated dicarboxylic acid imide compound. Results are illustrated in Table 1.

EXAMPLES 8-9

The same procedures as described in Examples 2 and 3 were respectively carried out except that low molecular weight polystyrene (D) having a number average molecular weight of 8000 was used. Results are illustrated in Table 1.

EXAMPLES 10-11

The same procedures as described in Example 2 were carried out except that conductive carbon (C) were used in proportions illustrated in Table 1. Results are illustrated in Table 1.

COMPARATIVE EXAMPLES 1-2

The same procedures as described in Example 1 were carried out except that amount of the polyphenylene ether resin (A) and the copolymer (B) of styrenic compound and α,β-unsaturated dicarboxylic acid imide compound was changed. Results are illustrated in Table 2. When the formulation ratio of these components deviates from the specified range in the invention, either processability or heat resistance causes remarkable reduction and the molded articles cannot be employed for practical use.

COMPARATIVE EXAMPLES 3-4

The same procedures as described in Example 3 were carried out except that the amount of conductive carbon (C) was changed. Results are illustrated in Table 2. When the formulation ratio deviates from the specified range in the invention, either processability or electrical conductivity is remarkably inferior and the molded articles cannot be employed for practical use.

COMPARATIVE EXAMPLES 5-6

The same procedures as described in Example 1 were carried out except that the amount of low molecular weight polystyrene (D) was changed. Results are illustrated in Table 2. When the formulation ratio deviates from the specified range in the invention, processability, electrical conductivity or heat resistance are remarkably inferior and the molded articles cannot be employed for practical use.

COMPARATIVE EXAMPLE 7

The same procedure as described in Example 2 was carried out except that a different polystyrene (for injection use, number average molecular weight=50,000, Toporex 500-51, manufactured by Mitsui Toatsu Chemicals, Inc.) was substituted for the low molecular weight polystyrene (D). Results are illustrated in Table 2. When the low molecular weight polystyrene (D) is not used, either processability or electrical conductivity is remarkably inferior and molded articles cannot be employed for practical use.

TABLE 1

| | Formulation and properties | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A) | Polyphenylene ether resin (parts by weight) | 90 | 80 | 60 | 90 | 80 | 80 | 70 | 80 | 60 | 80 | 80 |
| | Inherent viscosity (dl/g) | 0.45 | 0.45 | 0.45 | 0.45 | 0.45 | 0.50 | 0.50 | 0.45 | 0.45 | 0.45 | 0.45 |
| (B) | Copolymer of styrenic compound and acid imide (parts by weight) | 10 | 20 | 40 | 10 | 20 | 20 | 30 | 20 | 40 | 20 | 20 |
| (C) | Conductive carbon (parts by weight) | 10 | 10 | 10 | 10 | 10 | 10 | 10 | 10 | 10 | 8 | 13 |
| (D) | Low molecular weight polystyrene (parts by weight) | 3 | 3 | 3 | 15 | 10 | 3 | 3 | 3 | 3 | 3 | 3 |
| (1) | Melt flow index | 9 | 12 | 14 | 13 | 15 | 13 | 14 | 10 | 12 | 14 | 8 |

TABLE 1-continued

| Formulation and properties | Example | | | | | | | | | | |
|---|---|---|---|---|---|---|---|---|---|---|---|
| | 1 | 2 | 3 | 4 | 5 | 6 | 7 | 8 | 9 | 10 | 11 |
| (g/10 min) | | | | | | | | | | | |
| (2) Heat distortion temperature (°C.) | 165 | 155 | 140 | 155 | 145 | 152 | 150 | 157 | 142 | 154 | 157 |
| (3) Surface resistance (Ω) | $2 \times 10^5$ | $1 \times 10^5$ | $3 \times 10^5$ | $6 \times 10^3$ | $3 \times 10^4$ | $4 \times 10^5$ | $2 \times 10^5$ | $6 \times 10^5$ | $3 \times 10^5$ | $2 \times 10^6$ | $3 \times 10^4$ |

TABLE 2

| Formulation and properties | Comparative Example | | | | | | |
|---|---|---|---|---|---|---|---|
| | 1 | 2 | 3 | 4 | 5 | 6 | 7 |
| (A) Polyphenylene ether resin (parts by weight) | 98 | 40 | 60 | 60 | 80 | 80 | 80 |
| Inherent viscosity (dl/g) | 0.45 | 0.45 | 0.45 | 0.45 | 0.45 | 0.45 | 0.45 |
| (B) Copolymer of styrenic compound and acid imide (parts by weight) | 2 | 60 | 40 | 40 | 20 | 20 | 20 |
| (C) Conductive carbon (parts by weight) | 10 | 10 | 3 | 40 | 10 | 10 | 10 |
| (D) Low molecular weight polystyrene (parts by weight) | 3 | 3 | 3 | 3 | 0 | 30 | 3 |
| (1) Melt flow index (g/10 min) | 0.5 | 18 | 16 | 0.2 | 1 | 23 | 2 |
| (2) Heat distortion temperature (°C.) | 182 | 114 | 134 | 142 | 155 | 103 | 152 |
| (3) Surface resistance (Ω) | X[1] | $2 \times 10^6$ | $>10^{13}$ | X[1] | $6 \times 10^{12}$ | $1 \times 10^4$ | $4 \times 10^{12}$ |

Note: [1] Poor flowability and molding is impossible.

What is claimed is:

1. An electrically conductive resin composition comprising:
   (A) from 50 to 95% by weight of polyphenylene ether resing which is homopolymer or a copolymer comprising one or more of structural units represented by the formula (I)

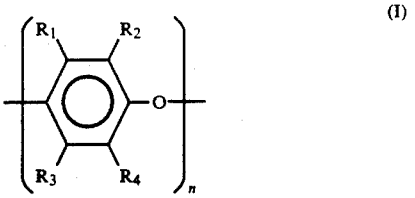

wherein each of $R_1, R_2, R_3$ and $R_4$ is individually selected from the group consisting of a hydrogen atom, halogen atom, hydrocarbon, halogenated hydrocarbon, hydrocarbonoxy group and haolgenated hydrocarbonoxy group and n is an integer of 20 or more, and which has an inherent viscosity of from 0.25 to 0.70 dl/g measured at 25° C. in a chloroform solution;
   (B) from 50 to 5% by weight of a copolymer of a styrenic compound which is one or more of compounds selected from the group consisting of styrene, 50-methylstyrene, o-methylstyrene and p-methylstyrene, and α,β-unsaturated dicarboxylic acid imide compound which is represented by the formula (II):

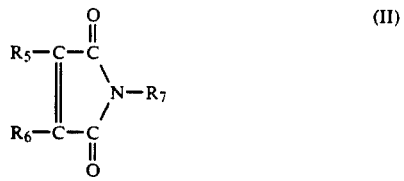

wherein each of $R_5$, $R_6$ and $R_7$ is individually selected from a hydrogen atom, alkyl, substituted alkyl, alkenyl, substituted alkenyl, cycloalkyl, substituted cycloalkyl, phenyl or substituted phenyl;
   (C) from 5 to 30 parts by weight of an electrically conductive carbon per 100 parts by weight of the sum of the resin (A) and the copolymer (B); and
   (D) from 1 to 20 parts by weight of a low molecular weight polystyrene per 100 parts by weight of sum of the resin (A) and the copolymer (B), the number of average molecular weight of the low molecular weight polystyrene (D) is 30,000 or less determined by gel permeation chromatography based on a polystyrene standard.

2. The conductive resing composition of claim 1 wherein the homopolymer or the copolymer is obtained by reaction of one or more of phenols selected from the group consisting of 2,6-dimethylphenol, 2,6- diethylphenol, 2,6-dibutylphenol, 2,6-didodecylphenol, 2,6-dipropylphenol, 2,6- diphenylphenol, 2-methyl-6-ethylphenol, 2-methyl-6-cyclohexylphenol, 2-methyl-6-methoxyphenol, 2-methyl-6-butylphenol, 2,6-dimethoxyphenol, 2,3,6-trimethylphenol, 2,3,5,6-tetramethylphenol and 2,6-diethoxyphenol.

3. The conductive resin composition of claim 1 wherein the compound represented by the formula (II) is one or more of compounds selected from the group consisting of maleimide, N-methylmaleimide, N- cyclohexylmaleimide, N-phenylmaleimide, N-(p-hydroxyphenyl)maleimide and N-benzylmaleimide.

4. The conductive resin composition of claim 1 wherein, in the copolymer (B), the proportion of the styrenic compound to the α,β-unsaturated dicarboxylic acid imide compound is in the range of from 30 to 95% by weight of the styrenic compound and from 70 to 5% by weight of the α,β-unsaturated dicarboxylic acid imide compound.

5. The conductive resing composition of claim 1, wherein the copolymer (B) has a number average molecular weight of 30,000 or less determined by gel permeation chromatography based on a polystyrene standard.

6. The conductive resing composition of claim 1 wherein the conductive carbon (C) is acetylene black or furnace black.

7. The conductive resin composition of claim 1 wherein the content of the polyphenylene ether resin (A) is from 80 to 95% by weight and the content of the copolymer (B) is from 20 to 5% by weight.

8. The conductive resing composition of claim 1 wherein the content of the conductive carbon (C) is from 6 to 20 parts by weight per 100 parts by weight of the sum of the resing (A) and the copolymer (B).

9. The conductive resin composition of claim 1 wherein the content of the low molecular weight polystyrene (D) is from 2 o 15 parts by weight per 100 parts by weight of the sum of the resin (A) and the copolymer (B).

* * * * *

UNITED STATES PATENT AND TRADEMARK OFFICE
CERTIFICATE OF CORRECTION

PATENT NO. : 5,149,465

DATED : September 22, 1992

INVENTOR(S) : Ueki et al.

It is certified that error appears in the above-identified patent and that said Letters Patent is hereby corrected as shown below:

Column 7, line 42, delete "resing" and insert therefor --resin--; and line 65, delete "50-methylstyrene" and insert therefor -- α-methylstyrene--.

Column 8, line 49, before "sum" insert --the--; and line 55, delete "resing" and insert therefor --resin--;

line 58, delete "2,6- diethyl-" and insert therefor --2,6-diethyl- --; and line 60, delete "2,6- diphenylphenol" and insert therefor --2,6-diphenylphenol--.

Column 9, line 13, delete "resing" and insert therefor --resin--.

UNITED STATES PATENT AND TRADEMARK OFFICE
CERTIFICATE OF CORRECTION

PATENT NO. : 5,149,465
DATED : September 22, 1992
INVENTOR(S) : Ueki et al

It is certified that error appears in the above-indentified patent and that said Letters Patent is hereby corrected as shown below:

Column 10, line 1, delete "resing" and insert therefor --resin--;

line 8, delete "resing" and insert therefor --resin--;

line 11, delete "resing" and insert therefor --resin--; and line 14, delete "o" and insert therefor --to--.

Signed and Sealed this

Twenty-sixth Day of October, 1993

Attest:

BRUCE LEHMAN

Attesting Officer

Commissioner of Patents and Trademarks